United States Patent [19]

Jinguji

[11] Patent Number: 4,706,134

[45] Date of Patent: Nov. 10, 1987

[54] PLAYBACK UNIT FOR STILL PICTURES WITH SOUND

[75] Inventor: Takumi Jinguji, Saitama, Japan

[73] Assignee: Pioneer Electronic Corporation, Tokyo, Japan

[21] Appl. No.: 718,125

[22] Filed: Mar. 29, 1985

[30] Foreign Application Priority Data

Mar. 30, 1984 [JP] Japan .................................. 59-62616

[51] Int. Cl.⁴ ............................................. H04N 5/76
[52] U.S. Cl. ................................................... 358/343
[58] Field of Search .................... 360/10.1, 32, 19.1; 358/342, 343

[56] References Cited

U.S. PATENT DOCUMENTS

| | | | |
|---|---|---|---|
| 4,138,694 | 2/1979 | Doi et al. | 360/32 |
| 4,383,279 | 5/1983 | Kenney, II | 358/342 |
| 4,446,488 | 5/1984 | Suzuki | 358/343 |
| 4,463,387 | 7/1984 | Hashimoto et al. | 360/32 |
| 4,499,506 | 2/1985 | Takahashi et al. | 360/32 |

Primary Examiner—Donald McElheny, Jr.
Attorney, Agent, or Firm—Sughrue, Mion, Zinn, Macpeak and Seas

[57] ABSTRACT

A playback unit for still pictures with sound for transmission of composite data, composed of audio and digital data, to an external device. The composite data is stored and then separated into audio and digital data. The audio data is transmitted with priority over the digital data.

1 Claim, 29 Drawing Figures

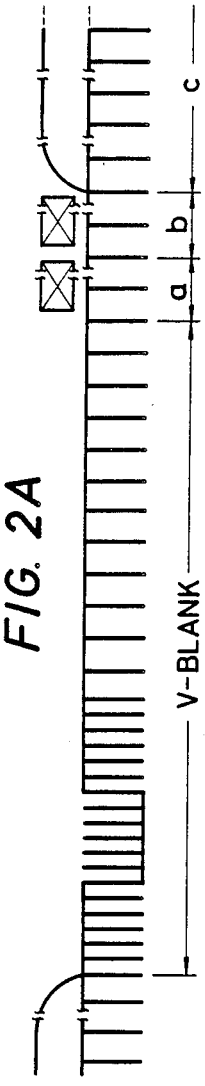
FIG. 2A
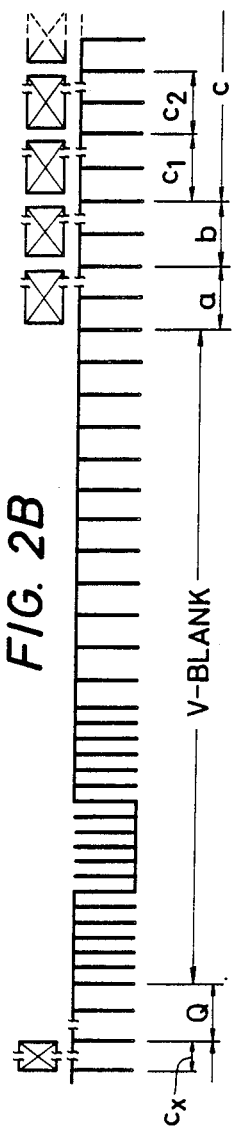
FIG. 2B
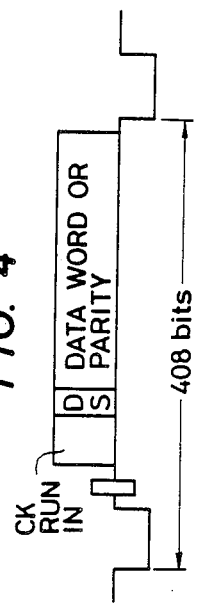
FIG. 4
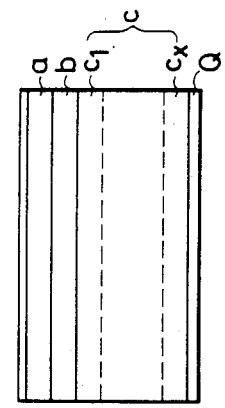
FIG. 3
FIG. 1

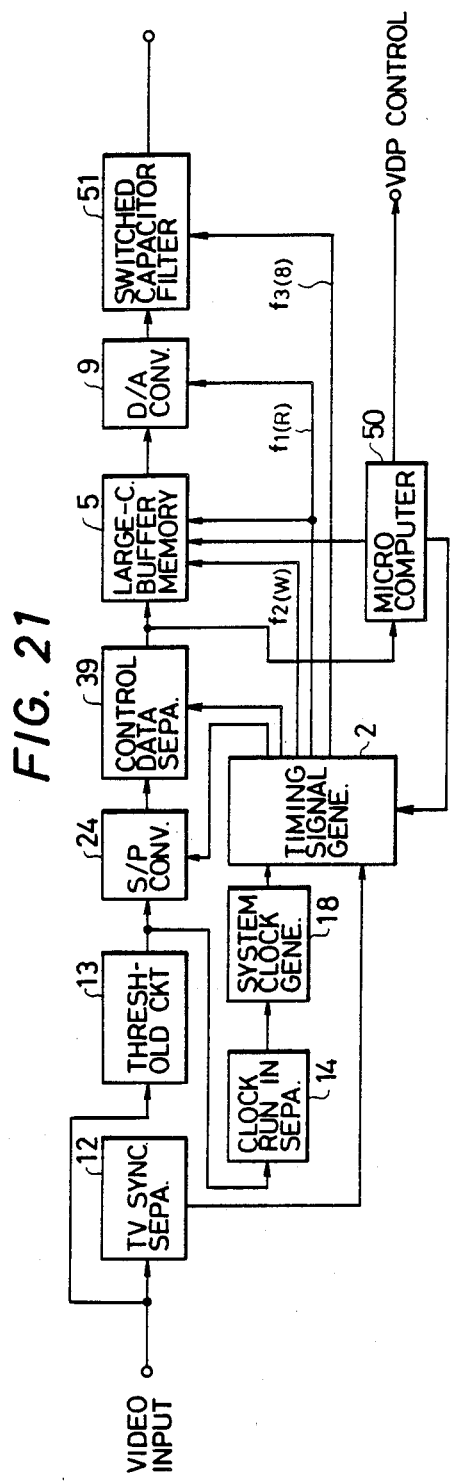
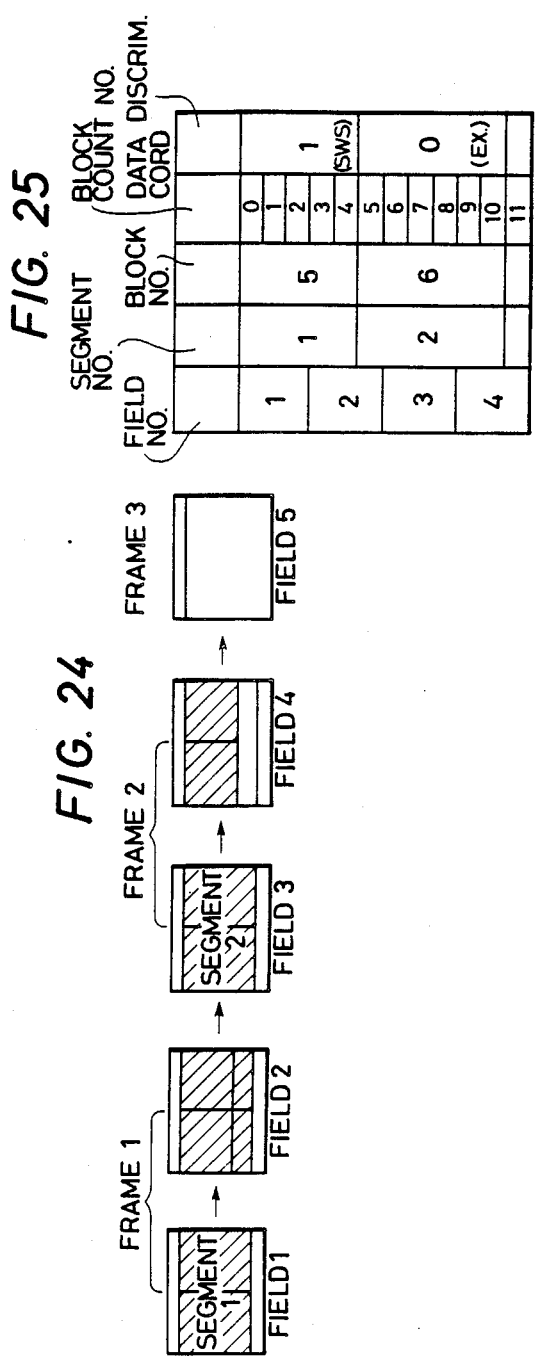

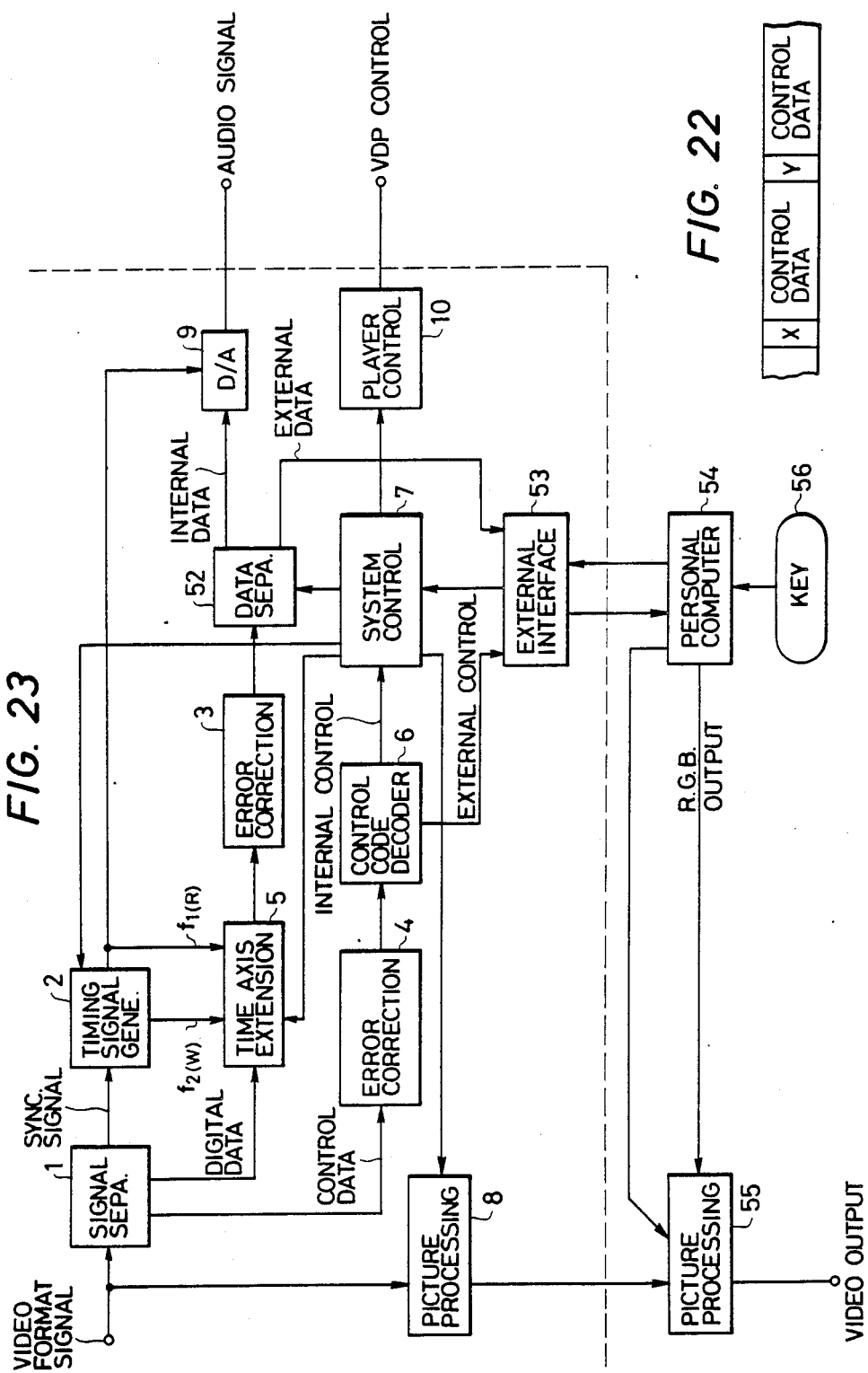

PLAYBACK UNIT FOR STILL PICTURES WITH SOUND

BACKGROUND OF THE INVENTION

This invention relates to a playback unit for still pictures with sound.

SUMMARY OF THE INVENTION

An object of the present invention is to provide a static video reproduction device which allows output of audio data to an external device, such as a personal computer, when outputting composite data, consisting of digital and audio data, even when an external device is not connected.

The device of the invention is featured in having means for storing composite data containing both audio and digital data, means for separating the composite data read from the storage means into audio and digital data, and means for transmitting with priority the audio data from the separated data followed by the digital data.

BRIEF DESCRIPTION OF THE DRAWINGS

FIG. 1 shows block divisioning of one field of an image frame;

FIGS. 2A and 2B shows an expanded view of the V-blanking interval of the video format signal;

FIG. 3 is a diagram showing numbers of scanning lines corresponding to the block in FIG. 1;

FIG. 4 shows the data content of a horizontal scanning line;

FIGS. 5A to 7 show instances of insertion of digital data and picture information;

FIG. 10 gives an example of a field SYNC waveform for a block a;

FIG. 21 is a block diagram of another example of a playback circuit;

FIG. 22 indicates another example of control data;

FIG. 23 is a block diagram of a yet further example of a playback circuit;

FIG. 24 is a diagram of another example of video software;

FIG. 25 shows the correspondence between a block c and data identification codes;

DESCRIPTION OF THE PREFERRED EMBODIMENTS

The invention will now be described in detail on the basis of an example.

In FIG. 1, the number of horizontal scanning lines (in the available picture area) for a signal corresponding to one field of a video frame is divided arbitrarily into blocks a, b, c, and Q. Blocks a, b, and c are composed of an integral number of horizontal scanning lines. The number of scanning lines in c is evenly divisible by an integer x so that $m=c/x$ where m is an integer. Accordingly, c is made up of units of m scanning lines each and can be divided into x sub blocks $c_1-c_x$. Q may be but need not be an integer.

FIGS. 2A and 2B shows parts of video format signals of FIG. 1. FIG. 2A shows a waveform corresponding to recording of picture data in blocks c and Q. FIG. 2B gives an example of a waveform where digital data is recorded in block c.

FIG. 3 provides concrete numeric data relating to the example of the division of scanning lines into blocks a, b, c, and Q for the case of an NTSC signal. Here, of the total of 262.5 scanning lines per field, 241.5 are treated as effective scanning lines. Blocks a and b are assumed to lie outside the visible range on the TV monitor screen. In this example, $a=1$, $b=4$, $c=234$, $x=9$, $m=26$ and $Q=2.5$. Interleaving is employed to avoid error concentration due to drop-out, etc., when digital data is inserted in blocks b and c. Correction codes are introduced to enable detection as well as correction of errors. In this example, block b includes divisions capable of independent interleaving and error correction. Similarly, $c_1-c_x$ in block c are made capable of independent interleaving and error correction.

In the example shown in FIG. 4, digital data is inserted on a horizontal scanning line. The data transmission rate is 408 $f_H$ (where $f_H$ represents the horizontal scanning frequency). A clock run-in signal, that is, a clock synchronization signal, is inserted before the digital data. Following this signal, a data synchronizing signal consisting of a few bits is introduced for data synchronization. This data synchronizing signal is followed by the data word and/or error detection and correction code.

Figure 5:
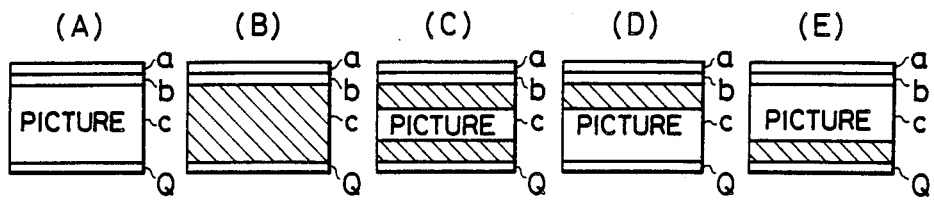

FIGS. 5 (A-E) show different recording modes. FIG. 5(A) shows picture data only inserted in blocks c and Q. Since blocks a and b are outside the visible range, c and Q are displayed as ordinary TV images. FIG. 5(B) shows block c with only digital data inserted therein. FIG. 5(C) shows block c divided into 9 sub-blocks with digital data inserted into $c_1$, $c_2$, $c_8$, and $c_9$ and picture data inserted into $c_3-c_7$. In the example of FIG. 5(D), digital data is inserted into subblocks $c_1$ and $c_2$ and picture data into $c_3-c_9$. In FIG. 5(E), picture data is inserted into subblocks $c_1-c_7$ and digital data into $c_8$ and $c_9$.

Figure 6:
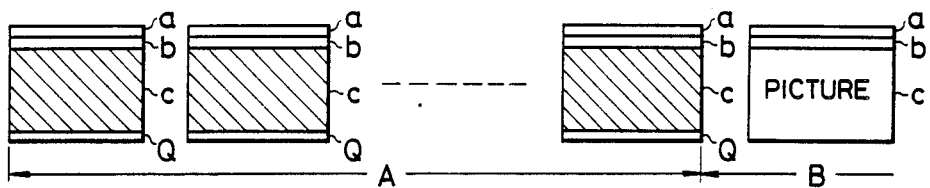

In FIG. 6, the frames (fields) of block c into which digital data is inserted continue over period A only. The number of such frames may range from a minimum of 3 to 4 to a maximum of 30 to 40 depending upon the quantity of data required. During period B following A, block c is filled almost completely with picture data. The picture data inserted normally corresponds to the data in period A. As a result, the data may be constituted by two pictures, pictures fed a frame at a time, or moving pictures. Furthermore, the same image may be recorded over several frames to avoid crosstalk of pictures between frames even in the case of still pictures.

Figure 7:
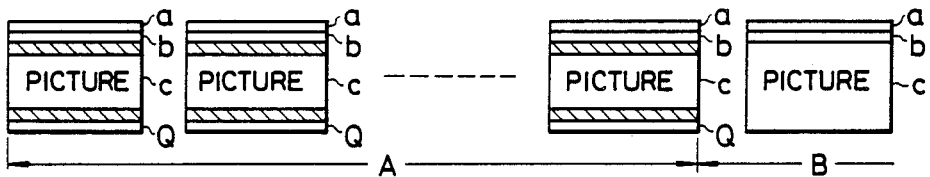

In the example shown in FIG. 7, a few to several frames of block c continue over period A, digital data being inserted in subframes $c_1$ and $c_9$, and picture data in $c_2$ to $c_8$. This is followed by period B where picture data only is inserted in block b. In this case, during period A, only part of the screen will contain the picture, but the image will not be discontinuous.

Figure 8:
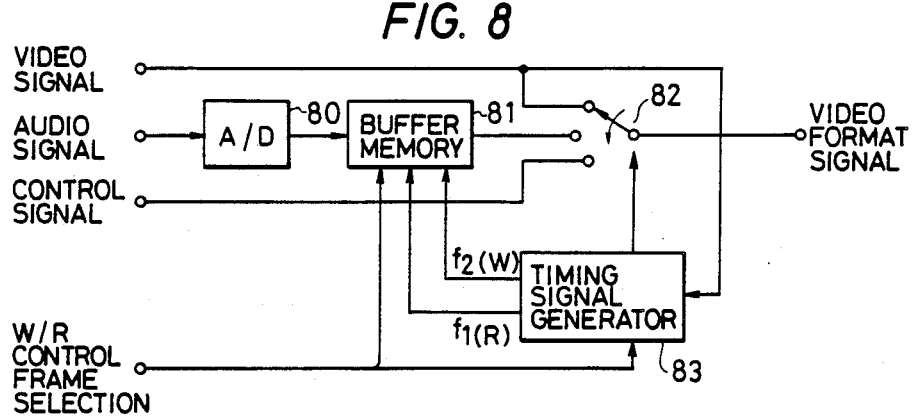
FIG. 8 is a block diagram of a circuit which operates in accordance with a video format signal recording method of the invention.

FIG. 8 is a block diagram of a recording circuit which operates in accordance with the recording method of this invention and which produces video format signals. Analog audio signals are converted into digital signals by A/D converter 80. For time-axis compression, the digital signal is stored in buffer memory 81 at a sampling frequency of $f_1(R)$. The contents of memory 81 are read out at a frequency $f_2(W)$ which is larger than $f_1(R)$. The control signal serving as the control data is made up of the clock line signal and data synchronizing signal earlier mentioned, and also the respective block data items, block capacities, and the respective processing data items needed to regenerate the data. The video signal, the digital data signal including the time-axis-compressed audio data in buffer memory 81, and the control data are fed to switching circuit 82. Control over the selection operation of switching circuit 82 is performed by timing signal generator 83. Timing signal generator 83 also controls writing and reading for memory 81. An internal transmitter in timing signal generator 83 is synchronized with the synchronizing signal for the input video signals. This generator generates different timing signals in response to control signals supplied from the outside. The video format signal to be recorded is obtained from the output of switching circuit 82.

Figure 9:
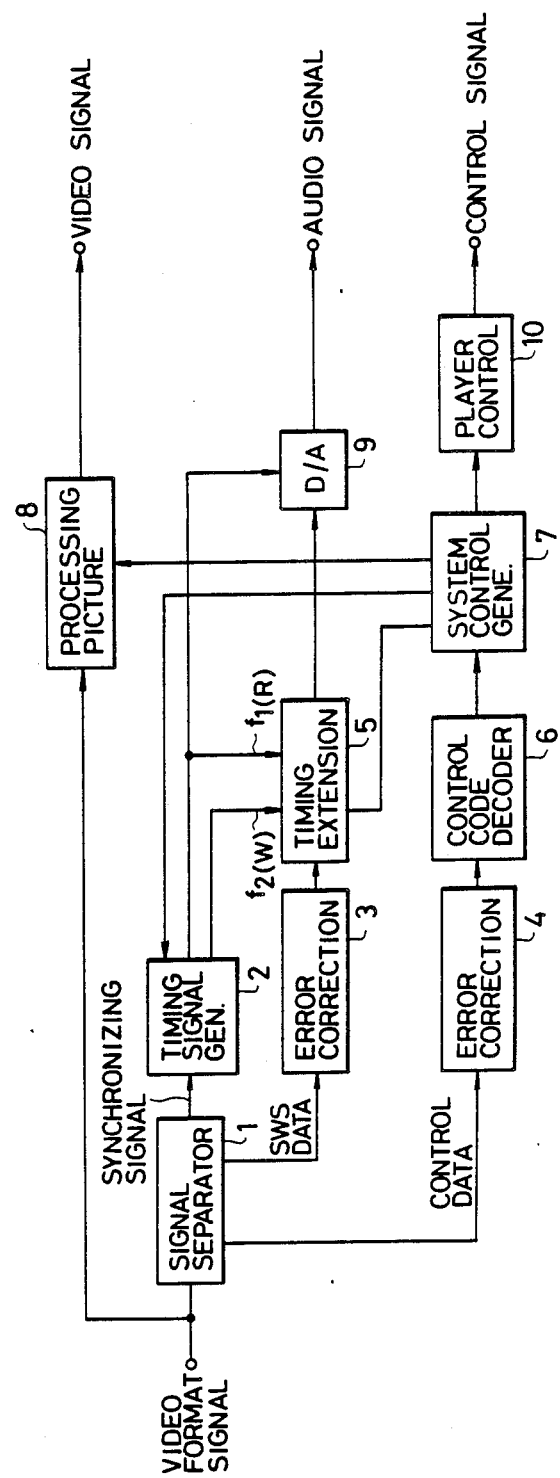
FIG. 9 is a block diagram showing an example of a playback circuit.

FIG. 9 provides a simplified block diagram of a general playback unit for reproducing still picture signals with audio data. The playback video format signals are separated by signal separator 1 into synchronizing signals and digital data. The digital data is then further separated into audio and control data. In response to the synchronizing signals, timing signal generator 2 generates timing signals including a write pulse $f_2(W)$ and a read pulse $f_1(R)$. Detection and correction of control data errors are performed by corrector 4. After correction, the control data is decoded by control code decoder 6 and applied to system control generator 7. The digital data is written by pulse $f_2(W)$ into the memory via corrector 3 and is read from the memory with pulse $f_1(R)$ for time-axis expansion. The system may be configured so as to have the digital data errors corrected after time-axis expansion. The time-axis-expanded digital data is converted into corresponding analog data by digital-analog converter 9 to produce the playback audio signal.

In response to the control instructions decoded by control decoder 6, various control signals are generated by system control generator 7. This playback video signal is derived via screen processor 8 operating in response to a specific control signal. The operation consists in, for example, processing a block with digital data as a black level block and applying the same as an output. As mentioned above, the video disk play (VDP) playback control signals are derived from the player controller 10 to effect control for stop or run (play) operation.

It has already been mentioned in the context of FIG. 1 that several combinations of, respectively, clock synchronizing signals, clock line signals for data synchronization, and data with data synchronizing signals are inserted in horizontal scanning lines in an initial block a of a field. This signal establishes synchronization between the clocks and data words at the start of respective fields. Block a is referred to as a field SYNC block. Details of the horizontal scanning line 1H of this block appear in FIG. 10.

The data transmission rate is $408f_H$, with no digital data being inserted at the 64th bit from the trailing edge of the H SYNC pulse. For field SYNC serial data, 320 bits are used. The 320 bits are further divided into 10 units of 32 bits each, each of these units including, respectively, a clock and a data synchronizing signal. Of the 32 bits, 24 bits represent the clock run-in signal, that is, 12 cycles of a pattern of 1010...10 followed by eight bits, 111000100, representing the data synchronizing signal. Ten of this 32 bit data, composed of these 24 bits plus eight bits, are inserted. A field equivalent to 24 bits is used as a front porch.

Figure 10:
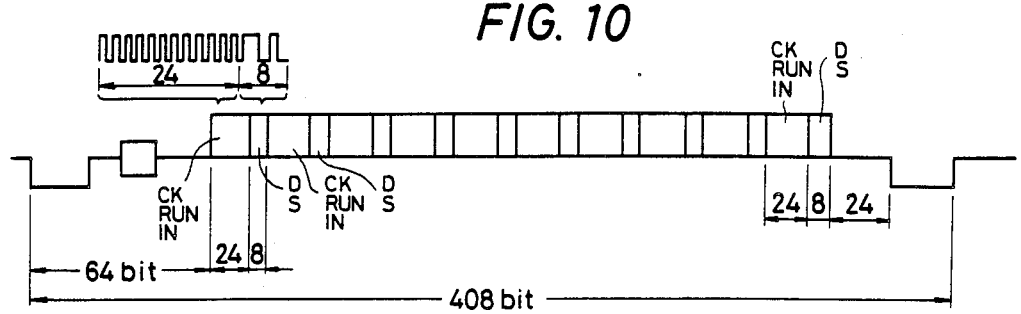
Figure 11:
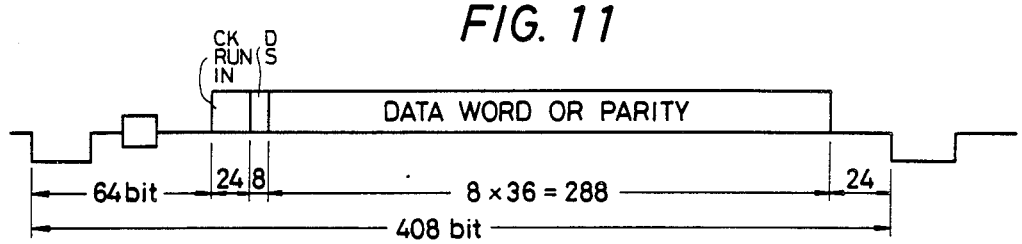
FIG. 11 shows an example of the waveform for a block c containing digital data corresponding to 1H.

In this example, the above signal array is inserted at the 22nd H, a being equal to 1. In block b, various control signals corresponding to the data contained in block c are inserted. When digital data is inserted in blocks b and c, the effective data will consist of 320 bits as in the case of the field SYNC (FIG. 11). There are 64 bits from H SYNC to the beginning of the serial-data porch corresponding to 24 bits. This is exactly like the field SYNC shown in FIG. 10. Again, the 320 bits include 24 bits at the beginning of the serial data, 12 cycles of the clock run-in signal, and, following these, a data synchronizing signal of eight bits. The remaining 288 bits are divided into 36 units of eight bits (1 byte) each. Furthermore, in accordance with this invention, block b is assigned to 4H. In other words, the control signals for, respectively, 23H, 24H, 25H, and 26H are recorded here. Also, the block b data is arranged in eight bit (1 byte) units so as to facilitate interleaving and error connection. To record digital data in block c, it is assigned to 26H. Digital data can be recorded with a maximum of nine blocks to a field and a maximum of 18 blocks to a frame. The screen may be made to contain exclusively digital or picture data, or a combination of digital and picture data. The digital data in a block is composed so as to facilitate interleaving and error correction a block at a time.

Figure 12:
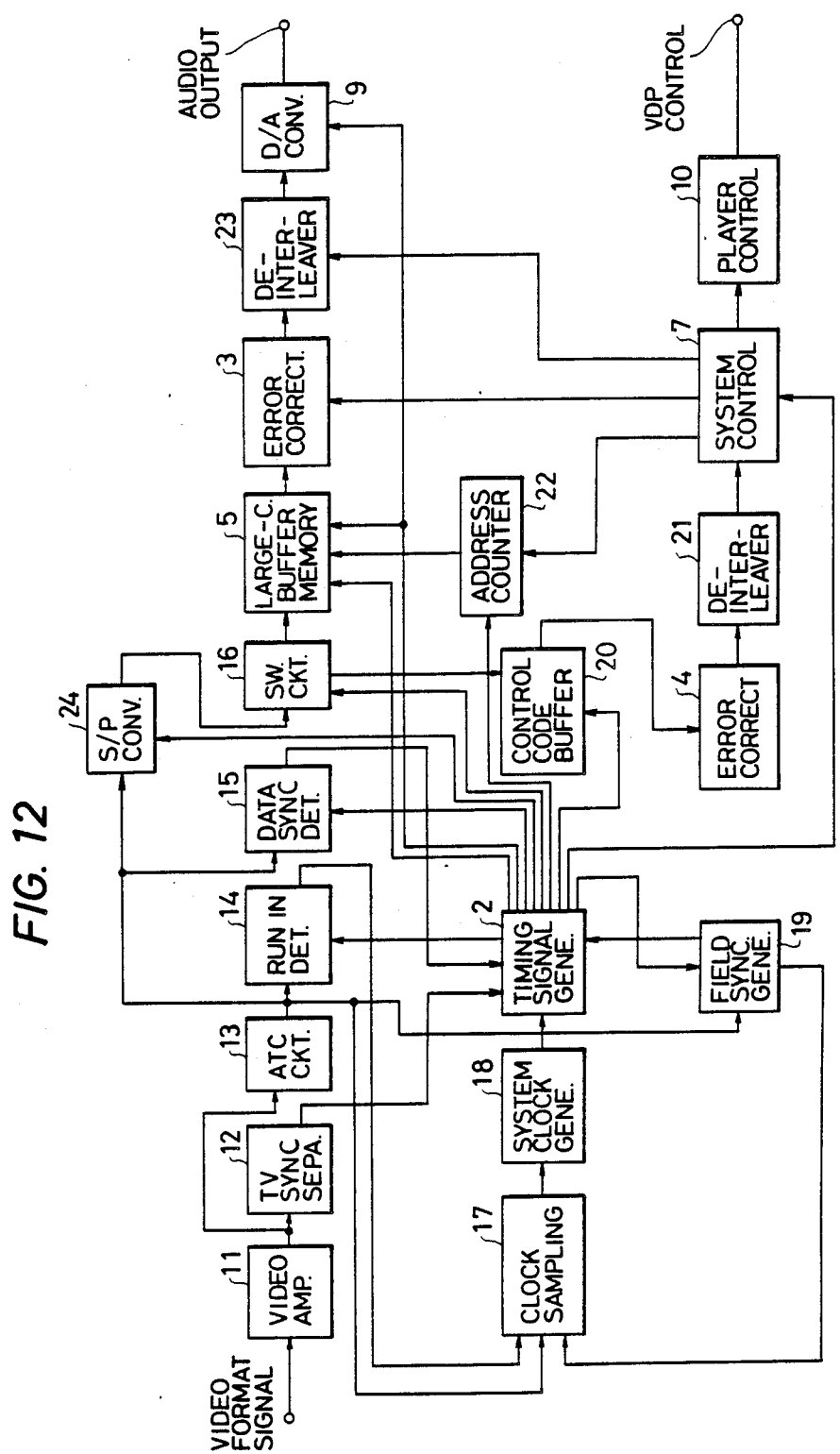
FIG. 12 shows another example of a playback circuit.

FIG. 12 is a block diagram of a playback circuit of the invention. This circuit is applicable to the case of audio signals added to still pictures with the digital data being time-axis compressed. The circuit includes video amplifier 11 used to amplify the video signals. TV synchronizing separator 12 is provided to separate the V SYNC and H SYNC signals from the video signals. ATC circuit 13 is provided to automatically set the threshold level from the amplified video signals to an optimum value following the data level, and to convert the analog video signals to NRZ (Non Return to Zero) digital serial data. Clock run-in signals from the digital data strings are detected by run-in detector 14. Data synchronizing detector 15 reads the digital data synchronizing signals, and, for each H, detects the initial position of the data within b and c. In a similar manner, S/P converter 24 reads the serial data synchronizing with the clock and converts it into eight-bit parallel data. Switching circuit 16 is provided to detect the data from 23H to 26H in the field, separate the control data signals, and to switch the output. Clock pulse sampler 17 samples the clock component from the serial data taking the run-in signal as a reference. System clock generator 18 applies a PLL (Phase-Locked Loop) operation to the sampled clock signals and generates the clock signals necessary for system operation. The timing signal generator 2 uses the clock signals obtained from the system clock generator as a reference and is controlled by the V SYNC and H SYNC signals separated by TV synchronizing separator 12 and the data starting point detection signal obtained from data synchronizing detector 15. Accordingly, it generates the different timing signals. Field SYNC detector 19 is controlled by the timing signals generated by the timing signal generator, detects the field SYNC signals, and synchronizes clock signals and data at the starting point of the respective fields according to the clock run-in signal and data period and pattern. Control buffer 20 temporarily stores the control codes separated by switching circuit 16. Error corrector 4 corrects the errors, if any, in the control codes read from the control code buffer. De-interleaver 21 processes the corrected control codes according to a predetermined control sequence. System controller 7 decodes the sequence of control codes and generates corresponding control signals. Address counter 32 receives an initial address signal from system controller 7 at the time data is written into or read from large-capacity memory 5. Similarly, it receives the clock pulses generated by timing signal generator 2 at the time data is written or read thereinto or therefrom, in either case, eight bits at a time. In either case it counts up and supplies address signals to buffer memory 5. Large capacity buffer memory 5 temporarily stores the digital data in block c in response to signal $f_2(W)$ from timing signal generator 2, and reads the data in response to $f_1(R)$. Error corrector 3 corrects the error in the large capacity buffer memory a block at a time. De-interleaver 23 converts the corrected data into a succession of serial data. Digital/analog converter 9 processes a series of digital data in response to signal $f_1(R)$ from timing signal generator 2 and converts it into analog signals. Player controller 10 receives the control signals from system controller 7 for the VDP and supplies the VDP with VDP control signals.

The VDP will perform a normal playback operation for a period A if it is playing back a video format signal recorded in, for instance, the pattern shown in FIG. 6. During this interval, the digital data inserted in block c will be recorded sequentially in memory 5. It is assumed that over the next period B, the VDP will reproduce still pictures or playback frame-fed data. The digital data stored in memory 5 will be applied as the present output. If this is time-axis compressed audio digital data, its output will occur at the corresponding still picture or frame-fed data playback time as analog audio data after time-axis expansion. Furthermore, during period A, the TV monitor will display the data clamped to a black level in screen processors 8 (FIG. 9).

Similarly, the digital data in block c will be successively stored in the memory during period A when the video format signal with the pattern shown in FIG. 7 is played back. The top and bottom of the monitor screen are made to remain at the black level, the image appearing in the intermediate area.

Following this, the playback video format signal from the VDP video output terminal is applied to video amplifier 11 and there amplified. The amplified output is applied to synchronizing separator 12, and the separated synchronizing signals (V and H) are fed to one of the input terminals of timing signal generator 2. The amplified video signal is applied to the input of ATC circuit 13. By detecting the peak and pedestal levels of the data, the ATC circuit gradually and automatically sets the threshold level while following the respective data, and extracts the serial NRZ digital data from the video signals. Controlled by the timing control signal from timing signal generator 2, run-in signal detector 14 detects the 24-bit 12-cycle clock run-in signal from the serial data extracted by the ATC output of detector 14 and applied to the clock sampling circuit 17, which extracts the clock component from the normal serial data, taking the clock run-in signal as a reference. The extracted clock component is supplied to system clock generator 18. From the extracted clock component, the system clock generator causes the PLL circuit to generate system clock signals synchronized with the serial data. These clock signals are employed for system operation. The clock signals generated by system clock generator 18 are applied to timing signal generator 2. Timing signal generator 2 generates timing signal applied to the control terminals of field SYNC detector 19, which is controlled by the synchronizing signals (V and H) with the clock signals as a reference, and detects the horizontal scanning line 22H in each field, and thereby the field SYNC. Timing signal generator 2 also generates the timing control signals to separate control data after detecting 23H to 26H, and generates control signals for data write and read operations following detection of 27H.

Serial data obtained as output from ATC circuit 13 is applied to data synchronizing detector 15 and S/P converter 24. All the data is read synchronously with the clock, and, for each H, synchronous data detector 15 detects data synchronizing signals, applies a detection output of timing signal generator 2, determines the initial position of data, and thereby maintains a constant synchronizing relation between the data and the timing signal. S/P converter 24 converts the serial data into eight-bit parallel data. The eight-bit data is applied to switching circuit 16. If timing signal generator 2 generates a signal indicating the presence of 23H to 26H, switching circuit 16 applies that signal to control code buffer 20; at all other times, it applies the signal to large-capacity buffer memory 5. The control code temporarily stored in control code buffer 20 is applied to the input terminal of error correcting circuit 4. The control code with its error corrected by the error correcting circuit is applied to the input of de-interleaver 21. De-interleaver 21 rearranges the control code according to the control sequence and applies the rearranged code to system controller 7. The system controller 7 decodes the control code and follows the timing control signals from timing signal generator 2 to perform operations of digital data writing, screen control, initialization of address counter 22 for the large-capacity buffer memory, and control of digital data. Control signals operating and stopping the player are applied to player controller 10. These signals are converted by the player controller into signals for driving the player, and are then supplied to the player. The horizontal scanning line 22H signal from timing signal generator 2 is applied to the control terminal of field SYNC detector 19. Based on a repetition of the clock run-in signal and data synchronizing signal, the detector generates the reference signal for the clock signal within the fields and data synchronization. These are fed back to clock sampling circuit 17 and timing signal generator 2. Next, when the signal indicating 27H, as detected from the output of the timing signal generator and the control codes, and the code indicating storage of digital data in the block are decoded by system controller 7, they are successively stored in large-capacity buffer memory 5 in response to signal $f_2(W)$ generated by timing signal generator 2 and in response to the control signal generated by the system controller. When the storage of a specified amount of data is complete, system controller 7 commands the player to generate still pictures in the specified frame, and the player generates still pictures. At that time, from large-capacity buffer memory 5, the initial address read from system controller 7 is set in address counter 22 and is read sequentially in response to signal $f_1(R)$ generated by timing signal generator 2. The data read sequentially from large-capacity memory 5 is fed to the correction circuit, there corrected, then applied to the input of de-interleaver 23. In the de-interleaver, the data is rearranged in the sequence of the original data, and then applied to the input of D/A converter 9. In D/A converter 9, the signal is converted into a corresponding analog audio signal and applied as an audio output. While an audio output is present, the player generates still pictures. Once data in the amount specified by large-capacity buffer memory 5 has been viewed and heard, search or play control signals are fed to the player according to the program codes.

The following describes clock synchronization and data synchronization in run-in signal detector 14, data synchronization detector 15, and field SYNC detector 19. Clock synchronization and data synchronization in a field are established for the first time by the 10 clock run-in cycles and data synchronizing signals included in the 22H field SYNC. In other words, the clock component in the clock run-in signal is extracted by clock sampling circuit 17, and the PLL circuit of clock generator 18 is synchronized therewith. This circuit is then synchronized with the data the initial position of which is detected by means of the data synchronizing signal and is applied to timing signal generator 2. The field SYNC includes 10 each of the clock run-in cycles and data synchronizing signal so as to be able to synchronize the clock and data in case part of the signal is lost, for instance, due to drop-out. After synchronization has been established within the field SYNC, clock and data synchronization are maintained while compensating for loss of clock signal phase synchronization or missing bits by using the clock run-in and data synchronization signals detected by, respectively, the run-in signal detector and data synchronization detector from the initial position of the respective Hs in the data. The clock run-in and data synchronizing signals at the initial position of the respective Hs are also used for synchronization if the clock signals or data go out of synchronization due to, for instance, drop out.

Figure 13:
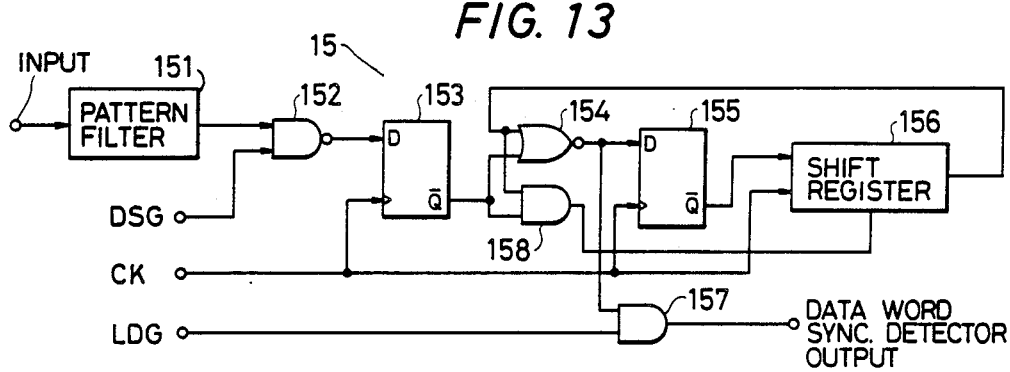
FIG. 13 is a circuit diagram of an example of a data synchronizing detector used in the circuit of FIG. 12.

FIG. 13 shows an example of data synchronizing detector 15. Here, pattern filter 151 detects the data synchronizing signal pattern 1100100, after which the detector issues detection pulses. Input of the detection pulses to the subsequent circuit is restricted by NAND gate 152 and a signal (DSG signal) at a specific timing because the detection pulse may be the result of detection of noise or a false data synchronizing signal. The detection pulse is latched by latch circuit 153, passes NOR gate 154, and is then stored by the other latch circuit, namely latch circuit 155. It is then successively fed to seven-bit shift register 156. Whether the MSB of this register and the corresponding detection pulse match at NOR gate 514 is also detected. If they do, synchronizing pulses are issued after detection of ten data synchronizing signals at 22H, as shown in FIG. 10. From 23H onwards (FIG. 11), however, the output timing is changed to allow issuance of the synchronizing pulses immediately after one data synchronizing signal is detected. To this end, a gate signal (LDG signal) of a specific timing is used at AND gate 157 to control the time of generation of the synchronizing pulses. This makes it possible to make use of 222H. Furthermore, AND gate 158 is also used to initially clear shift register 156.

Figure 14:
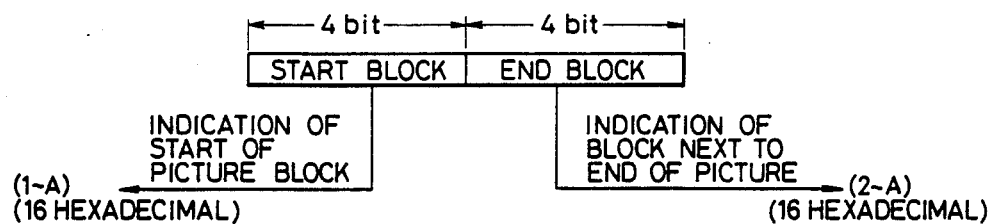
FIG. 14 is a diagram of an example of the control data.

Within block c, the picture and digital data must be distinguished from each other. To make this possible, an indicator of the following block is used as the control data, which indicator is inserted at the beginning and the end of the picture data. An example of this appears in FIG. 14 where four start block bits are used at the beginning of the picture data. The four bits can take values from 1 to A (hexadecimal). Four end block bits are used to designate where the picture data ends, taking any value from 2 to A (hexadecimal). These values of the respective four bits, however, change according to the value of x dividing block c into subblocks. The example here corresponds to x=9. Table 1 below shows the correspondence between the video format signals in FIG. 5 and the respective start and end block codes.

Figure 15:
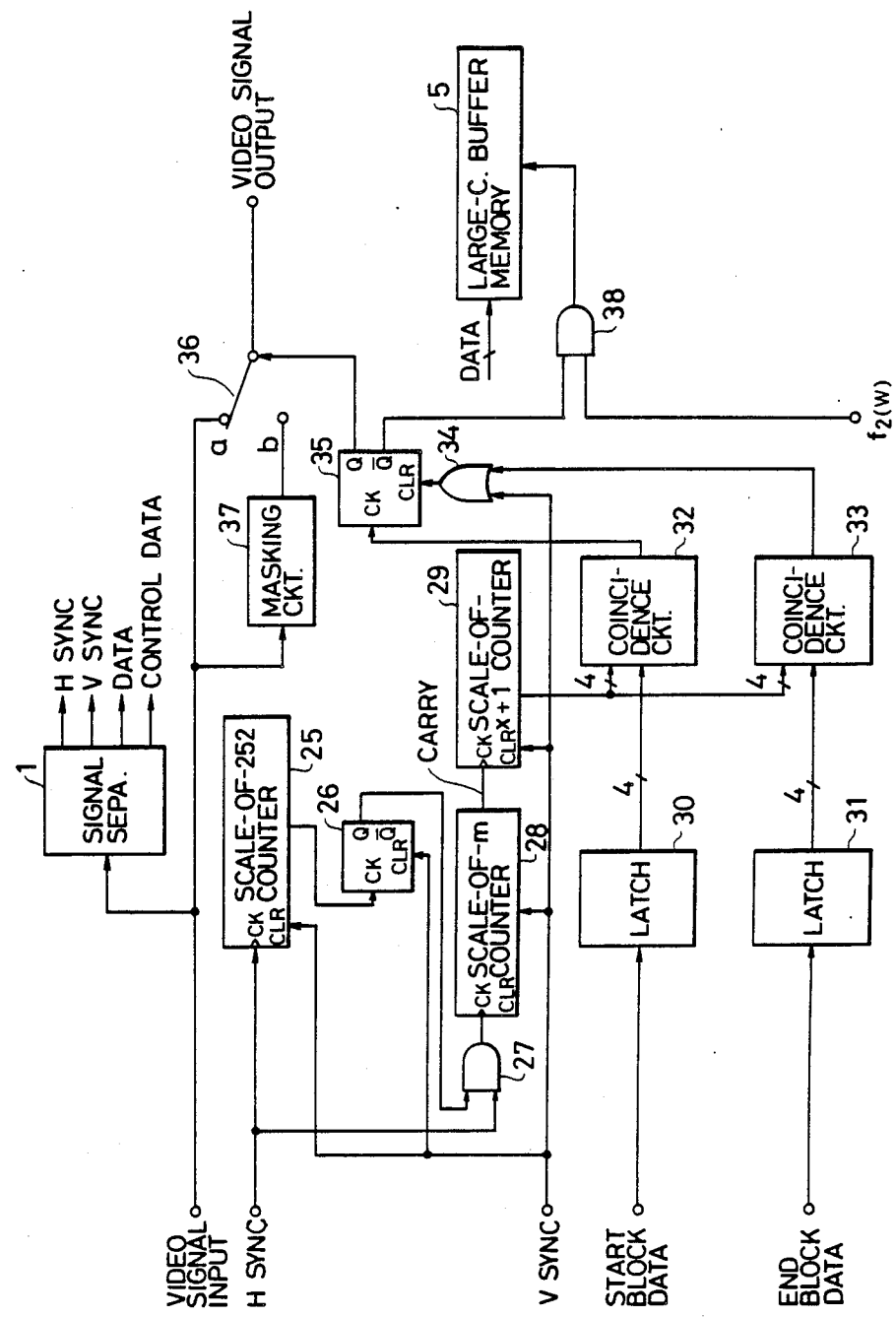
FIG. 15 is a block diagram of another example of a playback circuit.

FIG. 15 is a block diagram of a playback circuit used for controlling the playback operation using a code indicating the position of insertion of the picture data. A divide-by-252 counter 25 is provided to detect 26H of the H SYNC from among the synchronization signals separated by signal separator 1 (FIG. 9), and also, at the same time, control the field designation. The Q output of flip-flop (FF) 26, which goes to "1" when a pulse is generated when the counter reaches 16, is employed as a clock signal for counter 28, fed thereto via an AND gate 27. The other input of the AND gate 27 receives H SYNC signals. A "1" output from gate 27 is generated from 27H and later H SYNCs. 27H and later H SYNCs form the clock input of the divide-by-26 counter 28, which is cleared by V SYNC. This counter detects the m-th subblock from among subblocks $c_1$ to $c_9$ in block c. In this example, m=26, which is equal to the counter radix 26. Decimal counter 29 counts in response to the carry signal from the counter 28 and is cleared by V SYNC. This counter counts the subblocks within blocks c and Q.

Four-bit latch 30 temporarily stores the four start block code signal bits from the control decoder 6 (FIG. 9) output, and four-bit latch 31 temporarily stores the four end block code signal bits. Coincidence circuit 32 receives as one of its inputs the output signal from four-bit latch 30 and as the other input the four-bit output signal $Q_1$–$Q_4$ indicating the status of decimal counter 29. Coincidence circuit 32 compares the two inputs, and if the corresponding bits are identical, sends out a pulse. Similarly coincidence circuit 33 receives as one of its inputs the output of four-bit latch 31, and as another four bit input $Q_1$–$Q_4$ from decimal counter 29, compares the two inputs, and if the corresponding bits agree, sends out a pulse. FF 35 receives as its clock input the pulse signal issued by coincidence circuit 32, and produces an output Q of "1" at that time. Output Q of FF 35 becomes "0" at the output from OR gate 34, which receives as one of its inputs the output from coincidence circuit 33 and as another input the V SYNC signal, thus generating a "1" output in the presence of any one or both of these inputs. When output Q is "1", it is connected to side a of switch 36, and which it is "0", it is connected to b of this switch. Masking circuit 37 is provided to set the black level of the picture. Switch 36 provides as its output the input video signal when Q is connected to a of this switch. When Q is connected to b of switch 36, masking circuit 37 issues its output. The other output Q from FF 35, connected to AND gate 38, controls application of write pulse $f_2(W)$ to large-capacity buffer memory 5.

The above configuration makes it possible for the video format signal combining picture and digital signals to be applied on the input side of signal separator 1 and, at the same time, at terminal a of switch 36. Of the components into which signal separator 1 separates its input signal, V SYNC applied to terminal CLR of divide-by-252 counter 25, terminal CLR of FF 26, terminal CLR of divide-by-m counter 28, terminal CLR of divide-by-(x+1) counter 29, and one of the input terminals of OR gate 34. This V SYNC initializes divide-by-252 counter 25, FF 26, divide-by-m counter 28, divide-by-(x+1) counter 29, and FF 35. The H SYNC signal separated by the signal separator is applied to clock terminal ck of divide-by-252 counter and also to one of the input terminals of AND gate 27. Divide-by-252 counter 25 controls the respective fields of an NTSC TV signal. For each field, the counter is cleared when V SYNC is active. In other words, it starts its incrementing operation each time a H SYNC pulse is applied starting from 11H. It issues a pulse after every 16 H SYNC pulses. The pulse corresponds to 26H of the respective fields of an NTSC TV signal. This pulse is applied to clock terminal ck of FF 26 when Q is in the "1" state. FF 26 acts as a flag, Q remaining at logic "1" as long as V SYNC continues to be applied to the CLR terminal after 26H. The Q output of FF 26 is applied to one of the input terminals of AND gate 27 while to the other input terminal of AND gate 27 there is applied H SYNC separated by signal separator 1. Accordingly, AND gate 27 generates an H SYNC output following 27 H. This causes H SYNC from block c on the screen (FIG. 1) to be applied on clock terminal ck of the divide-by-m counter.

The divide-by-m counter is used to control the sub-blocks of the various blocks. In this example, m=26. The carry output of divide-by-m counter is applied to clock terminal ck of divide-by-(x+1) counter. Divide-by-(x+1) counter 29 controls the position of the sub-blocks in a block. This counter counts not only area c but area Q as well until the arrival of V SYNC, and, therefore, has a radix (x+1). Since x is 9, the radix is 10 for this counter. The four-bit output $Q_1-Q_4$ indicating the status of the counts is applied to input terinals of coincidence circuits 32 and 33. Further, a control data start block code separated by signal separator 1, indicating the beginning of picture data, is applied to the input terminal of latch 30 and is stored therein. The period of this storage is equal to either one field or one frame. The output is applied to the other input terminal of coincidence circuit 32. The coincidence circuit compares each of the four bits with the corresponding four bits, and if they are identical, pulses are issued at the output. Similarly, a control end block code separated by signal separator 1, indicating an address of the block following the end of the picture data, is applied to the input of latch 31. The output is applied to the other input terminal of coincidence circuit 33. The corresponding bits are compared, and if they coincide, pulses are issued. The output of coincidence circuit 32 is applied to the clock terminal of FF 35. Also, the output of coincidence circuit 33 is applied to one input of OR gate 34. The output of OR gate 34 is applied to clear terminal CLR of FF 35. If the coincidence pulse from coincidence circuit 32 is applied to FF 35, its output Q goes to "1". If the coincidence pulse from coincidence circuit 33 is applied to FF 35, its output Q becomes "0", which is exactly opposite of output Q of FF 35 when a pulse is received from circuit 32. Output Q from FF 35 is applied to switch 36. The switch is set to a when output Q of FF 35 is logic "1", and to b when Q is logic "0". The Q output of FF 35 is applied to one of the input terminals of AND gate 38. To the other input terminal of AND 38 gate is applied write pulse $f_2(W)$ generated only within block c by timing signal generator 2 (FIG. 9). When output Q from FF 35 is "0", AND gate 38 supplies write pulse $f_2(W)$ to large-capacity buffer memory 5 and successively stores data separated by signal separator 1.

For the waveform shown in FIG. 5C, for example, the start block code is 3 and the block code is 8. Correspondingly, latches 30 and 31 are set to, respectively, 3 and 8. Initially, the Q output of FF 35 is "0", so that switch 36 is set to b. As a result, the video output is the output of masking circuit 37. The masking circuit masks the video signals, excluding the synchronizing signals and color burst, under a black level. The resultant screen is black. Since output Q from FF 35 is a logic "1", AND gate 38 will continue to generate the $f_2(W)$ pulse as its output, causing the data generated by signal separator 1 to be written successively in buffer memory 5.

Coincidence circuit 32 generates pulses when divided-by-(x+1) counter 29 has counted to 3. At the leading edge of this pulse, therefore, output Q from FF 35 becomes "1". Accordingly, switch 36 gets set to a and input video signals, namely the image information, is applied as an output. Since output Q from FF 35 is "0", pulses are not generated from gate 38. Accordingly, no data is written into buffer memory 5. Similarly, when the divide-by-(x+1) counter has counted up to 8, pulses generated by coincidence circuit 33 pass through OR gate 34 and are applied on terminal CLR of FF 35. As a result, output Q from this FF becomes "0", and switch 36 is set to b. This makes output from masking circuit 37 possible again. In other words, the screen will be black again. At the same time, output Q from FF 35 becomes "1", and $f_2(W)$ generated by the timing signal generator makes the output from AND gate 38 write the data separated by the signal separator in sequence into the large capacity buffer memory.

Figure 16:
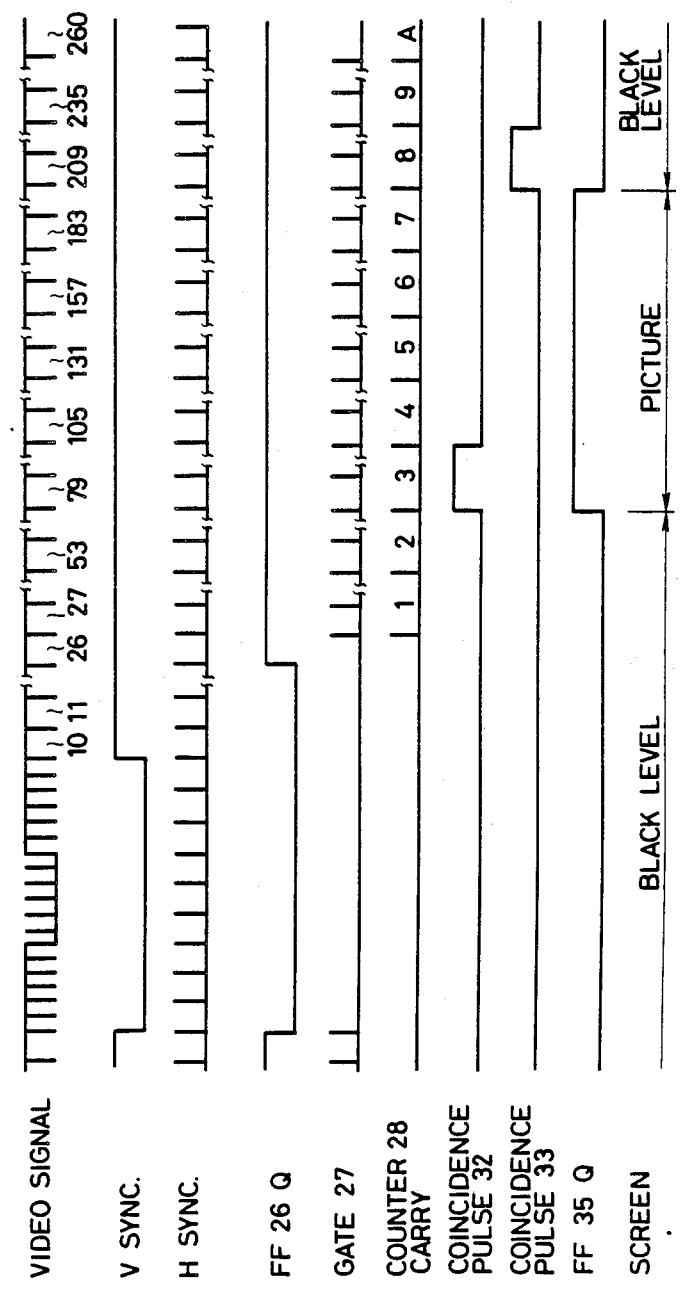
FIG. 16 is a timing chart for the playback circuit of FIG. 15.

The timing for the above operations is indicated in FIG. 16. FIG. 16 shows the first field of the first frame of an NTSC signal. The information shown in this figure, however, applies to the video signals of the second field as well. In the above example, control data differentiating between picture and digital data and detecting the position of digital data is constituted by the starting picture data block and the block following the end of the picture data. However, the starting digital data block or the block following the end of digital data can serve the same purpose. Even the first and the last digital data blocks can be used as the control data. The audio digital data (SWS data) to be inserted need not be monaural and may be constituted by stereo data.

Figure 17:
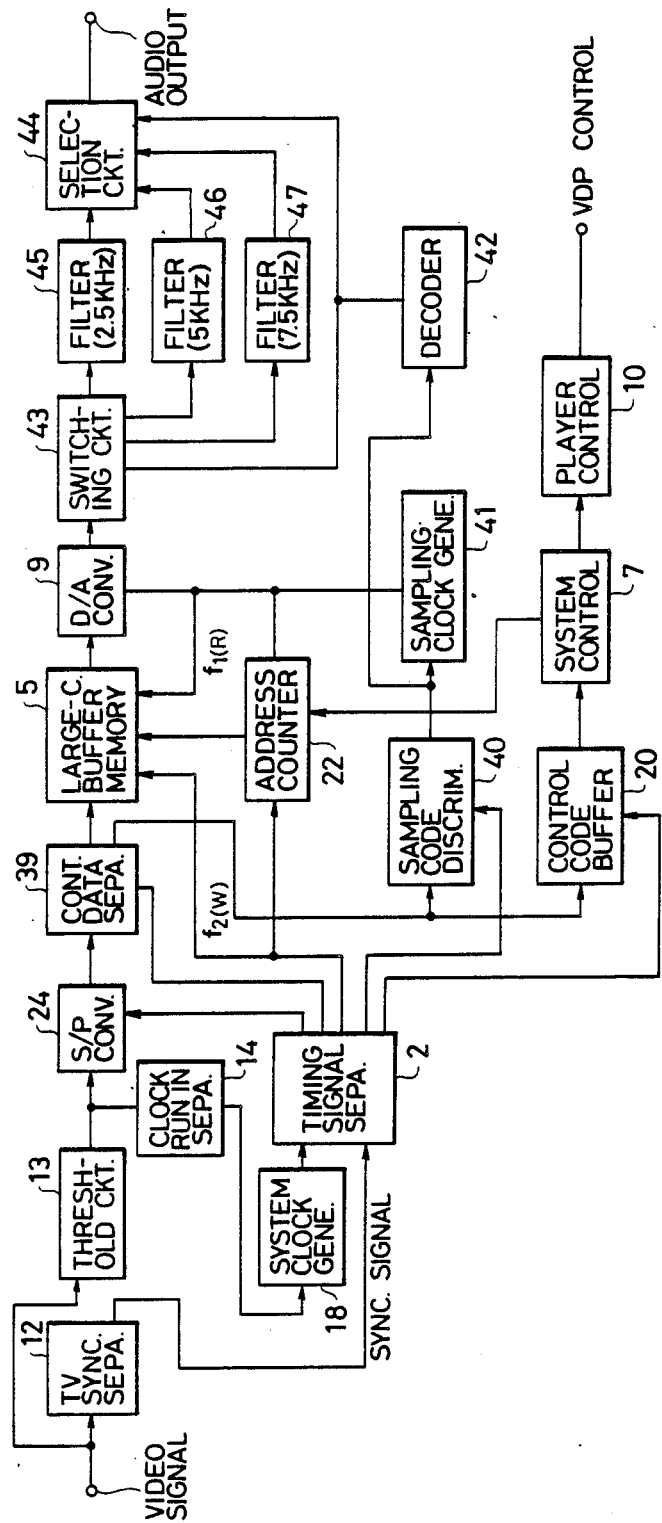
FIG. 17 shows yet another example of a playback circuit.

FIG. 17 is a block diagram of a playback unit used for video format signals where the audio data comprises different types and has varying contents and, at the same time, a complex tone content. The video format signal is sent to synchronizing separator 12 which separates it into V SYNC and H SYNC signals. At the same time, the video format signal is sent to timing signal generator 2 in order to generate timing signals. The input video format signals are fed also to an ATC circuit. The ATC circuit prevents data reading errors caused due to errors in the video signal or differences in video disks. Thus, the best threshold level is determined on the basis of the peak and pedestal levels of data inserted in the video signals, whereby the data of the analog video signals is changed into NRZ digital signals with their waveform shaped. From the data converted into digital signals, clock run-in separator 14 separates the clock run-in signals. System clock generator 18 generates a system clock of the same phase as clock run-in signals.

The serial digital data, after separation of the clock run-in signal, is converted into eight-bit parallel data by S/P converter in response to the signal generated by timing signal generator 2. In conformity with the timing generated by timing generator 2, clock control data separator 39 separates the control data from the eight-bit parallel data. Using the latch signal from timing signal generator 2, sampling code discriminator 40 identifies the sampling code defined from the control data. The audio data other than the control data passing through control data separator 39 is stored in large capacity buffer memory 5, its address being specified by address counter 22. When signal $f_2(W)$ is applied to the clock input terminal of address counter and system controller 7 specifies the initial address, the following addresses are successively stored while being counted by the address counter in response to $f_2(W)$. $f_2(W)$ represents the transmission rate for time-axis compression.

Clock $f_1(R)$ read from large capacity buffer memory 5 is the sampling clock generated in accordance with the output of sampling code discriminator 40. It is applied also to D/A converter 9 and commands starting of D/A conversion. The starting address at the read time is specified by system controller 7 at the write time while address counter 22 continues counting up in response to $f_1(R)$. The sampling code, composed of two bits, is latched by code discriminator 40. On receiving the two-bit data, sampling clock generator 41 can generate four types of sampling clocks. In this system, however, it generates three sampling clocks at, respectively, 35 KHz, 64 KHz, and 96 KHz. D/A converter 9 operates at these three sampling frequencies. The audio data is converted to digital data by adaptive delta modulation (ADM) so that the D/A converter converts ADM audio data into the corresponding analog audio signals.

Using a two-bit sampling code, decoder 42 controls switch circuit 43 and selector circuit 44. The respective codes are made to pass through the corresponding filter (45–47). For sampling clock frequencies of 32 KHz, 64 KHz, and 96 KHz, the filters used are, respectively, for the 2.5 KHz band, 5 KHz band, and 7.5 KHz band. The codes stored and decoded in control code buffer 20 make system controller 7 perform its control operations. Similarly, they cause player controller 10 perform its control (stop, playback, frame feed, etc.) of the player.

Figure 18:
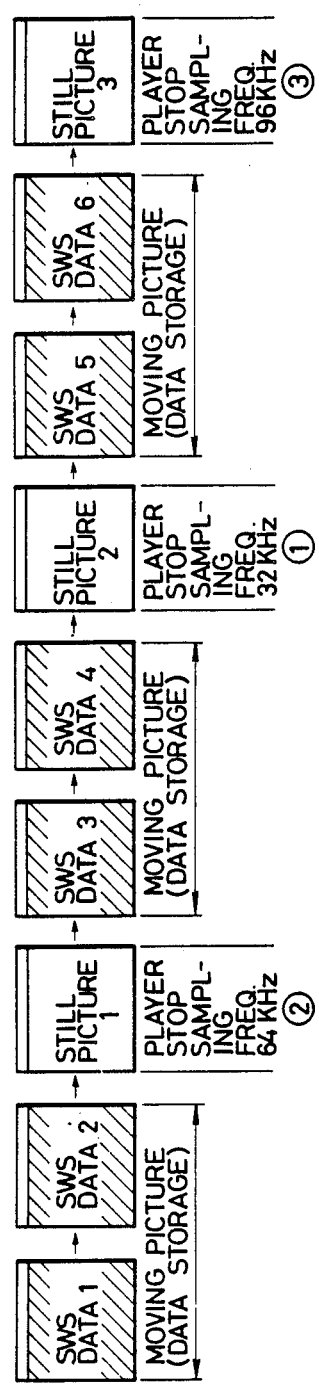
FIG. 18 shows an example of the video software used with the invention.

FIG. 18 shows the video software. The SWS data corresponding to still picture number 1 are data 1 and data 2, those corresponding to still picture 2 are data 3 and data 4, and those corresponding to still picture 3 are data 5 and data 6. The two-bit sampling code forming part of the control data appears in Table 2 below.

The control data is stored in the frame just preceding the frame it controls. During VDP playback, the control data in the frame preceding the one representing SWS data 1 is used by discriminator 40 to ascertain that the sampling frequency is 64 KHz, after which SWS data 1 and SWS data 2 are stored in large-capacity buffer memory 5. For still pictures, SWS data 1 and SWS data 2 are played back at a sampling frequency of 64 KHz. Next, discriminator 40 checks that SWS data 3 and SWS data 4 are at sampling frequency 32 KHz for still picture 1. Accordingly, SWS data is stored, and for still picture 2, playback takes place at a sampling frequency of 32 KHz. Similarly, still pictures are handled by applying a frequency of 96 KHz for playback. In this way, the sampling frequency may be changed for recording or playing back according to the content and type of SWS data, and also the tone content of the original audio data.

Figure 20:
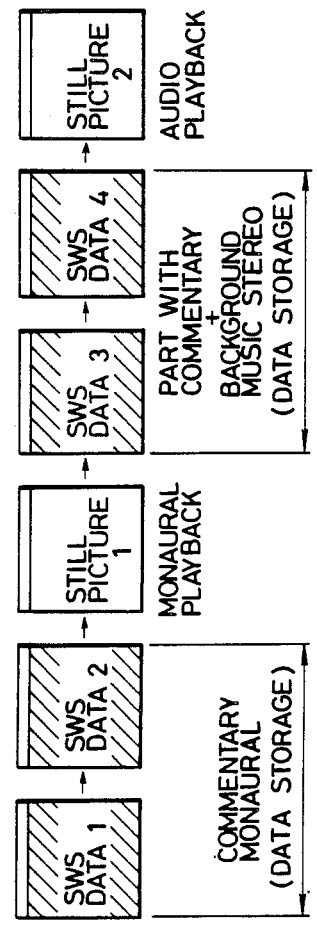
FIG. 20 provides another example of the video software.
Figure 19:
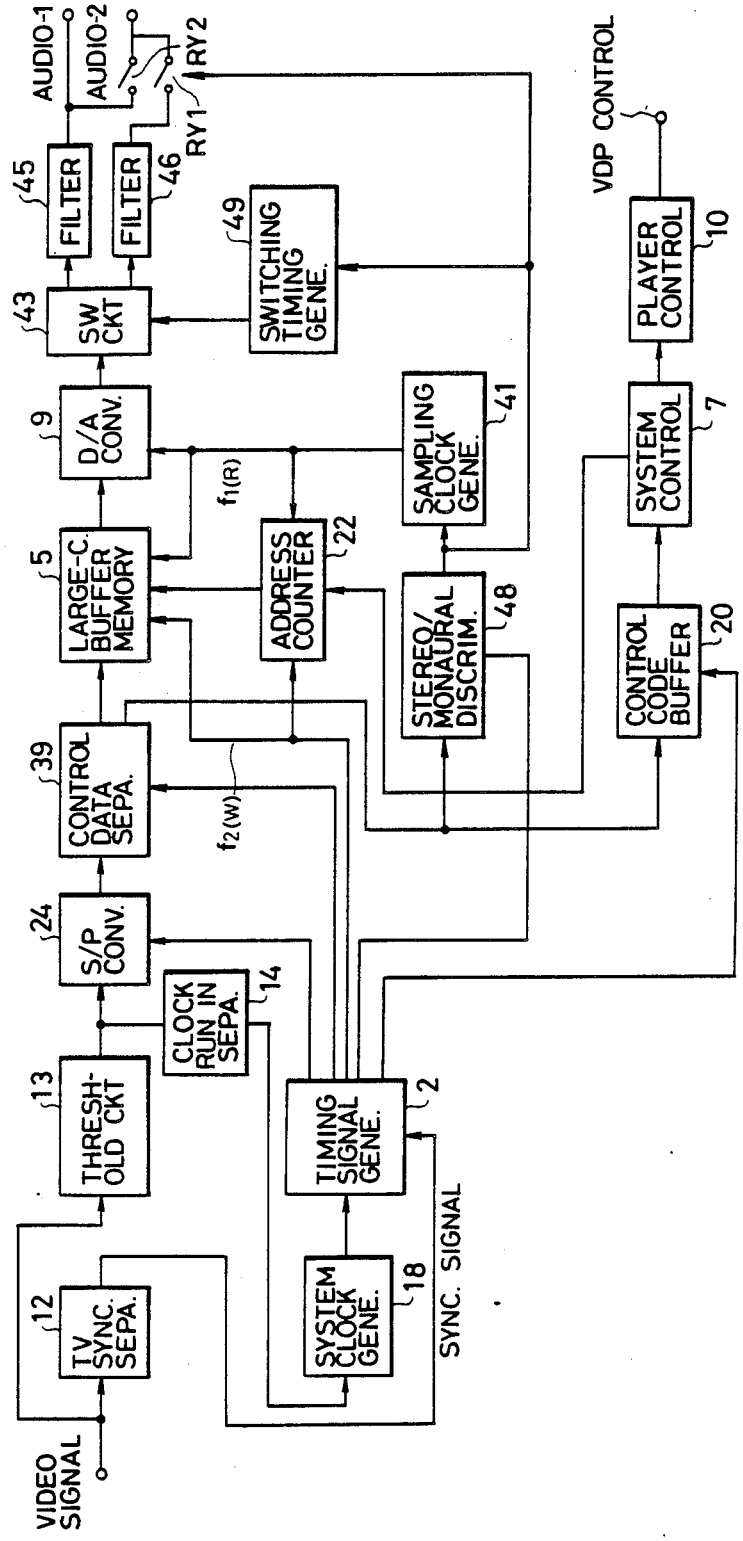
FIG. 19 depicts a further example of a playback circuit.

FIGS. 19 and 20 relate to, respectively, monaural and stereo SWS data. FIG. 19 shows the block diagram of the playback system for monaural SWS data. The following description relates to only those areas in FIG. 19 that differ from FIG. 17. Discriminator 48 samples and discriminates the stereo/monaural identification data inserted in the control code. The result of this discrimination is sent to sampling clock generator 41, switch timing generator 49, and audio output line switch relays RY 1 and RY 2.

Depending upon whether stereo or monaural SYS data is identified, switch circuit 43 receives a switch timing signal generated by timing generator 49, and in response switches analog audio signals and sends them to filters 45 and 46. These filters are used to eliminate high-frequency components such as the sampling frequency component. Relays RY 1 and RY 2 switch the audio signal depending upon whether the SWS data is monaural or stereo. The following description of block operations in FIG. 19 refers to the video format in FIG. 20. The stereo/monaural identification data forming part of the control data contained in the frame preceding SWS data 1 is sampled and identified by discriminator 48 and, accordingly, SWS data 1 and data 2 are stored in memory 5. The data thus stored in memory 5 is read at the still picture 1 playback time and is played back as monaural data. Using the control data in the frame for still picture data 1, stereo data is identified, and accordingly SWS data 3 and 4 are stored in memory 5 to be read and played back as stereo data at still picture 2 playback time.

In the monaural mode, $f_1(R)$ is equal to the sampling frequency, whereas in the stereo mode, it is double the sampling frequency. Time-axis expansion is affecting using $f_1(R)$. To obtain identical bands in both the stereo and monaural modes, the respective frequencies $f_1(R)$ must be related as follows between monaural and stereo modes: frequency $f_1(R)$ in stereo mode = 2 × frequency $f_1(R)$ in monaural mode. Accordingly, sampling clock generator 41 generates sampling clocks in accordance with the monaural/stereo identification data and reads data from memory 5.

In the above example, the output from D/A converter 9 is separated at switch circuit 43. Switching between the two causes the outputs from large-capacity buffer memory 5 to be separated at the switching circuit and the respective outputs so separated to be applied to the D/A converter and the respective outputs of the D/A converter to be applied to filters 45 and 46.

Control data, as described above, is contained in the frame preceding the one containing the controlled data. However, both the control data and controlled data may be contained in the same frame.

The example in FIG. 17 shows use of three low-pass filters corresponding to the applied sampling frequencies. The three filters are used independently, switching them to the different frequency bands. However, instead of these three, a single switched capacitor filter (basically a combination of a switch and a capacitor with its transmission characteristics shifting as the clock frequency changes) may be used instead. This filter can operate as that for the different frequency bands if the clock frequency is changed according to the sampling frequency. Otherwise, a microcomputer may be used for control.

FIG. 21 shows an example in which a switched capacitor filter and a microcomputer are used. The following description omits those areas of this figure that are common in FIG. 17. The control data separated by separator 39 causes the microcomputer to supply address data to large-capacity buffer memory 5 at, respectively, read and write times, and to generate player control signals. Moreover, the microcomputer decodes the switching code for the sampling frequencies and supplies timing signal generator 2 with control codes to generate the signals of three sampling frequencies and clock frequencies for supplying to switched capacitor filter 51.

Apart from write pulse $f_2(W)$, the timing signal generator generates three types of sampling pulses $f_1(R)$ under control of microcomputer control signals, and, correspondingly, clock frequencies $f_3(B)$ to function as frequency band filters. Frequency $f_1(R)$ is supplied to large-capacity buffer memory 5 and D/A converter 9. Frequency $f_3(B)$ is supplied to switched capacitor filer 51. The switched capacitor filter transmission characteristic shifts similarly with respect to the clock frequency, whereby the filter performs its functions according to the requirements of the respective frequency bands.

Here the digital data is the still picture data with sound. If software data is added to this for operating external units other than this, e.g., a personal computer or other digital signal processor, the VDP and computer can be controlled from the recording medium, namely the video disk. Thus, depending upon requirements, external digital data besides internal SWS data can be inserted in block c. To distinguish between the internal and external paths of these data items, the corresponding identification data is inserted within the control data in block b. FIG. 22 shows an example of the identification data signals. Bit Y in this figure distinguishes between the internal and external digital data and is inserted at a specific location within the control data. When Y is "0", it indicates internal SWS data, and when it is "1" it indicates external digital data. As the figure also shows, at another specified location, bit X is inserted to distinguish between internal and external control data. When X is "0", the following data is internal control data, and when it is "1", the following data is external control data. Bits X and Y are discriminated at playback time to enable control of external devices such as a personal computer.

A block diagram of the playback system appears in FIG. 23. The video signal is applied to both signal separator 1 and screen processor 8. The separated synchronizing signal is applied to the input of timing signal generator 2. The control data separated by signal separator 1 is applied to the input of error corrector 4. Also, internal (sound) data or external data is transmitted and stored in sequence in buffer memory 5 for time-axis expansion in response to timing signal $f_2(W)$ generated by timing signal generator 2. In response to signal $f_1(R)$ obtained from timing signal generator 2, data is read from buffer memory 5 and applied to the input error corrector 3. After correction of errors, the internal (sound) or external data is applied to the input of data separator 52. The separated sound data is fed to the input of D/A converter 9. At D/A converter 9, the digital signals are converted into corresponding analog signals, that is, audio signals. For time-axis expansion of audio signals, the relation that must be maintained between the frequencies is $f_2(W) < f_1(R)$. The corrected control data obtained from error corrector 4 is applied at the input of the control code decoder.

Bit X in the data shown in FIG. 22 causes the data selector to apply its control data output to the input of system controller 7. Separated by timing generator 2, external control data output is applied to external system interface 53. A digital data control signal corresponding to bit Y in the internal control data constituted by output 1 from system controller 7 is applied to data separator 52. In response to this data, data separator 52 applies the external data output on external interface 53.

One of the outputs from system controller 7 is applied to the switching control terminal of the read/write switch for memory 5. The other outputs are applied, respectively, to the control terminal of timing signal generator 2 and the input terminal of screen processor 8. The screen controller provides as its output unmodified normal pictures and digital signals replaced by a black level.

Player controller 10 responds to the different signals from system controller 7 by issuing, among others, the VDP stop, normal playback, and frame feed signals. The output from interface 53 is applied to the external input of an external system (personal computer) 54 to cause the personal computer to perform various operations. Again, the external output of personal computer 54 (in general constituting player control request and SWS playback request signals) is applied to the input of external interface 53. This signal is applied to the input of system control 7 and is operated upon simultaneously with the internal control data. RGB (three primary colors) signals from personal computer 54 and the video data processed by screen processor 8 are applied to the input of external screen processor 55. Control signals from personal computer 54 are applied to the control terminal of screen processor 55, the output from which switches between video output, RGB output, and mixed video and RGB signals. Keyboard 56 is used as an input device for the personal computer.

Another example of a video format including digital data from the personal computer and the VDP internal SWS data is seen in FIG. 24. In this example, block c in the respective fields is divided into, respectively, subblocks $c_1$, $c_2$ and $c_3$ in each field (these subblocks are subsequently referred to as "blocks" for convenience). Segment 1 contains SWS data describing the still picture data (frame 3) contained in segment 1. Blocks $c_1$-$c_3$ in field 1 and blocks $c_1$ and $c_2$ in field 2 make up five blocks in total. Segment 2 contains external data, including block $c_3$ of field 2, blocks $c_1$-$c_3$ of field 3, and blocks $c_1$ and $c_2$ of field 4, that is, six blocks in all. Also, block $c_3$ in field 4 contains picture data at the black level. Correspondence between the data relating to the fields, segments, and blocks on the one hand and the internal data identification codes on the other is shown in FIG. 25. The number of blocks (block count) is given by counter 63. In each segment, the digital data is assigned and accompanied by a segment number. The quantity of data in a segment is expressed in terms of the number of subblocks.

Figure 26:
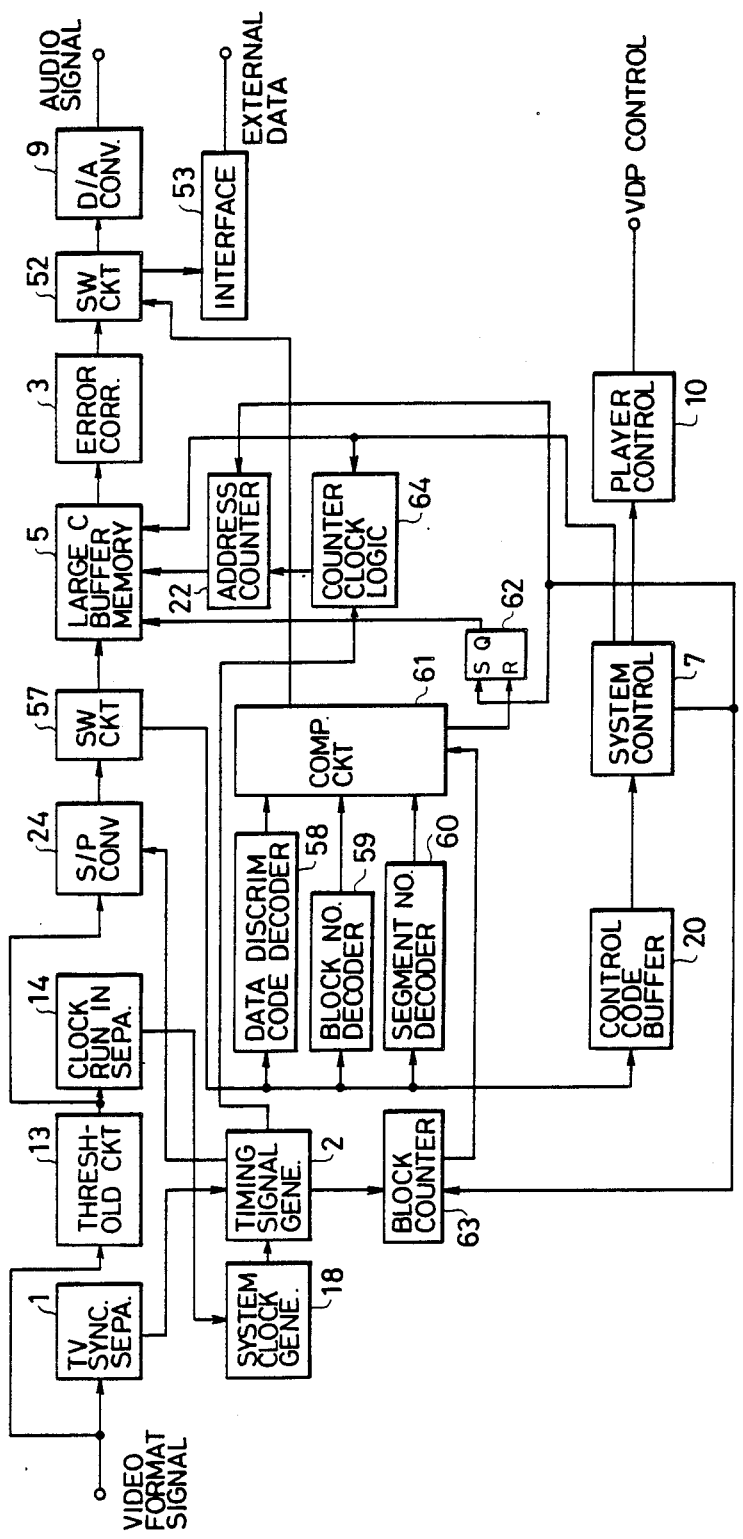
FIG. 26 shows a block diagram of still another example of a playback circuit.

FIG. 26 is a block diagram of a playback system used to reproduce the video format signals of FIG. 24. In this figure, 57 represents a circuit for switching between control and digital data other than control data. A switching circuit 52 selectively sends SWS data to D/A converter 9 and the other digital data to interface 53. At 63 is designated a block counter counting the respective blocks each time data enters memory 5, the block counter being reset by pulses from system clock generator 18. 58 is a data identification code decoder which determines from the control code whether the digital data is SWS data or some other external data. A block number decoder 59 decodes the codes indicating the number of blocks mixing up the respective digital data, and a segment number decoder 60 decodes the codes (from the control data) indicating the respective segment numbers, applying its output to comparator circuits 61.

Based on the segment numbers, number of blocks, and data identification codes decoded by, respectively, decoders 58–60, and also the output of block counter 63, comparator circuit 61 sends switching circuit 52 an H level when reading SWS data blocks from memory 5 and an L level when reading external data blocks. When all the data has been read, it applies a reset pulse to reset FF 62. Codes decoded by decoders 58–60 from the control data are stored temporarily in control code buffer 20. FF 62 is set by the output from system controller 7.

The system thus described writes in memory 5 the contents of segment 1 in FIG. 24, starting and proceeding sequentially from the initial data. All the data in segment 1 and segment 2 are stored in the buffer. Following this, when VDP starts playing back the still pictures, system controller 7 resets program counter 63 and, at the same time, changes memory 5 to the read status. As soon as the first block in segment 1 has been read, counter 63 is set to 1, its contents being incremented by 1 each time a block is read from the memory. The number of blocks corresponding to segment 1, namely, counts '0' to '4' by the counter, corresponds to data identification code '1' (FIG. 25). For this reason, an H level, indicating SWS data, is sent to switching circuit 52. Blocks corresponding to segment 2, namely counts '5' to '10', correspond to data identification code '0'. For this reason, L-level indicating external data is sent to switching circuit 52.

When counter 63 reads '11' and all the data has been read, comparator 61 resets FF 62. The Q output from this FF stops reading from the memory. The above operation causes the contents of segment 1 to be applied as an audio signal output from D/A converter 9. The contents of segment 1 are sent as external data to the personal computer across interface 53.

When composite SWD data composed of digital data and audio data is output to external devices such as a personal computer, no appropriate control signal from the external device is applied to the playback unit for still pictures with sound because there is no connection thereto. This creates a problem that audio data cannot be reproduced.

Figure 27:
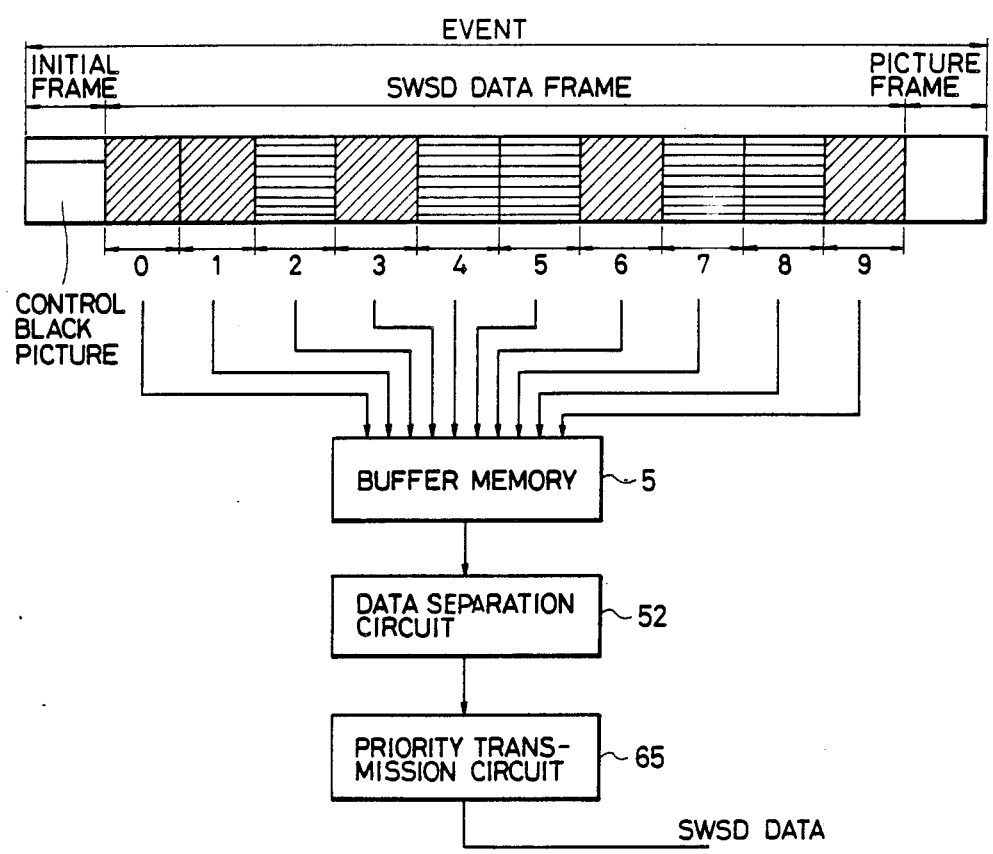
FIG. 27 is an example of a reproduction system in which the audio data is transmitted with priority.
Figure 28:
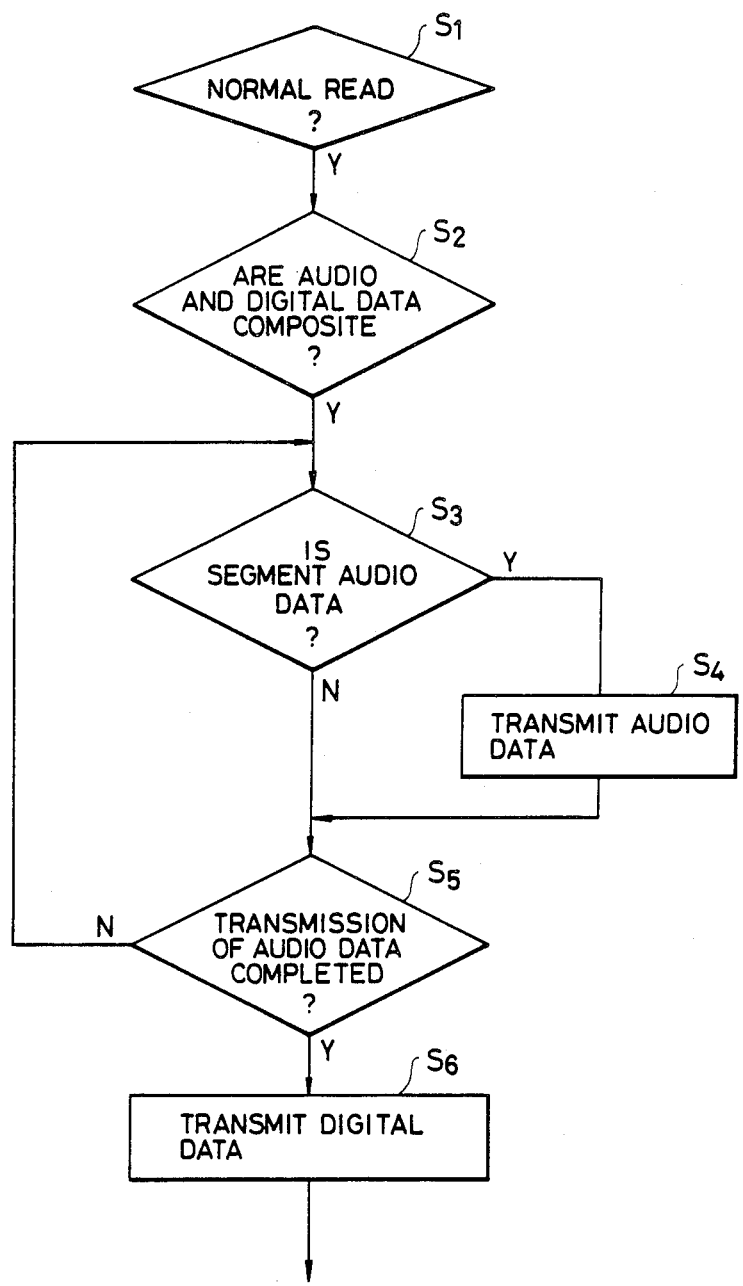
FIG. 28 is a flowchart illustrating the operations of the system of FIG. 27.

FIG. 27 illustrates a reproduction system which overcomes this problem. FIG. 28 is a flowchart describing the operations of the device. In FIG. 27, one event consists of an initial frame containing control data, while the SWSD data consists of audio and digital data. For purposes of description, it is assumed that segments 2, 4, 5, 7 and 8 are audio data segments.

Thus, the SWSD data is stored in the buffer memory. When the data is read from the buffer memory, a check is made to determine whether the read operation is a normal read operation (Step S1). In case of a normal read operation, a further check is made to determine whether the read data is composite data consisting of audio and digital data (Step S2). In case the read data consists of both audio and digital data, the SWSD data is routed to the data separation circuit 52. The circuit 52 checks whether the segment data is audio data (Step S3). If the segment data is identified as audio data, the priority transmission circuit 65 sends the audio data before sending the digital data (Step S4). The audio data priority transmission circuit 65 checks whether all the audio data, that is, segments 2, 4, 5 and 8, have been transmitted. If all the data has been transmitted, control is returned to Step S3 (Step S5). If all the audio data, that is, segments 2, 4, 5, 7 and 8, has been transmitted, the audio data priority transmission circuit transmits the digital data, that is segments 0, 1, 3, 6 and 9 (Step S6).

In the above-described manner, the audio and digital data separated by the data separation circuit 52 is transmitted by the audio data priority transmission circuit in the noted order.

As described hereinbefore, in the playback unit for still pictures with sound according to the present invention, audio data is transmitted before the digital data when transmitting composite SWSD data consisting of audio and digital data, allowing audio data to be transmitted even when an external device is not connected, thus realizing operations identical to the SWSD data with audio data alone.

TABLE 1

| Symbols used in FIG. 5 | Start Block Code | End Block Code | Remarks |
| --- | --- | --- | --- |
| (A) | 1(Hexadecimal) | A(Hexadecimal) | Full screen pictures in C |
| (B) | A(Hexadecimal) | X | Full screen data in C |
| (C) | 3(Hexadecimal) | 8(Hexadecimal) | Picture at screen center |
| (D) | 3(Hexadecimal) | A(Hexadecimal) | Picture at lower side of screen |
| (E) | 1(Hexadecimal) | 8(Hexadecimal) | Picture at upper side of screen |

Note:
In the above, X may take any hexadecimal value

TABLE 2

| | Sampling frequency | Corresponding Code | Sound band |
|---|---|---|---|
| (1) | 32 KHz | 01 | 2.5 KHz |
| (2) | 64 KHz | 10 | 5.0 KHz |
| (3) | 96 KHz | 11 | 7.5 KHz |

I claim:

1. A method of transferring data from a playback unit for still pictures with sound to an external utilization device such as a personal computer, comprising the steps of:
  (a) storing in a buffer memory still-with-sound data comprising an initial frame of control data, composite data comprising a plurality of segments of which some consist of digital audio data and others consist of digital data other than audio data, and video data;
  (b) reading data out of said buffer memory;
  (c) determining whether step (b) is a normal read operation in which data read from said buffer memory is to be transferred to said external utilization device;
  (d) for a normal read operation, checking to determine whether the data being read from said buffer memory is said composite data;
  (e) if in step (d) the data is said composite data, determining which segments of said composite data contain audio data;
  (f) transferring each segment of said composite data containing audio data to said external utilization device; and
  (g) after all segments of said composite data containing audio data have been transferred to said external utilization device, transferring to said external utilization device the remaining segments of said composite data containing said digital data other than said audio data.

* * * * *